US009971600B2

(12) United States Patent
Brownscheidle et al.

(10) Patent No.: US 9,971,600 B2
(45) Date of Patent: May 15, 2018

(54) TECHNIQUES TO WAKE-UP DEPENDENT INSTRUCTIONS FOR BACK-TO-BACK ISSUE IN A MICROPROCESSOR

(71) Applicant: International Business Machines Corporation, Armonk, NY (US)

(72) Inventors: Jeffrey C. Brownscheidle, Seattle, WA (US); Sundeep Chadha, Austin, TX (US); Maureen A. Delaney, Richmond, VT (US); Dung Q. Nguyen, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 14/751,730

(22) Filed: Jun. 26, 2015

(65) Prior Publication Data

US 2016/0378503 A1   Dec. 29, 2016

(51) Int. Cl.
*G06F 9/38*   (2006.01)
(52) U.S. Cl.
CPC .......... *G06F 9/3838* (2013.01); *G06F 9/3836* (2013.01); *G06F 9/3855* (2013.01)
(58) Field of Classification Search
CPC ..... G06F 9/3838; G06F 9/3836; G06F 9/3855
See application file for complete search history.

(56) References Cited

U.S. PATENT DOCUMENTS

| | | | | |
|---|---|---|---|---|
| 6,308,260 | B1 * | 10/2001 | Le | G06F 9/3836 712/215 |
| 6,553,484 | B1 * | 4/2003 | Sawamura | G06F 9/3836 712/207 |
| 7,991,979 | B2 | 8/2011 | Abernathy et al. | |
| 8,086,826 | B2 | 12/2011 | Brown et al. | |
| 8,966,229 | B2 * | 2/2015 | Tran | G06F 9/30087 712/214 |
| 9,110,656 | B2 * | 8/2015 | Tran | G06F 9/30087 |
| 2008/0082788 | A1 | 4/2008 | Veidenbaum et al. | |

(Continued)

OTHER PUBLICATIONS

R. Gran, et al., "On Reducing Misspeculations in a Pipelined Scheduler", INSPEC/IEEE, AN-10761728, 2009, 12 pages.

(Continued)

*Primary Examiner* — Yuqing Xiao
(74) *Attorney, Agent, or Firm* — Patterson + Sheridan, LLP (57) ABSTRACT

Techniques are disclosed for back-to-back issue of instructions in a processor. A first instruction is stored in a queue position in an issue queue. The issue queue stores instructions in a corresponding queue position. The first instruction includes a target instruction tag and at least a source instruction tag. The target instruction tag is stored in a table storing a plurality of target instruction tags associated with a corresponding instruction. Each stored target instruction tag specifies a logical register that stores a target operand. Upon determining, based on the source instruction tag associated with the first instruction and the target instruction tag associated with a second instruction, that the first instruction is dependent on the second instruction, a pointer to the first instruction is associated with the second instruction. The pointer is used to wake up the first instruction upon issue of the second instruction.

17 Claims, 5 Drawing Sheets

(56) References Cited

U.S. PATENT DOCUMENTS

2011/0185159 A1\* 7/2011 Bishop ................ G06F 9/3855
 712/208

OTHER PUBLICATIONS

IBM, "Using a mask to block the wakeup of dependants of already-issued instructions", IP.com, IPCOM000193322, Feb. 18, 2010, 2 pages.

Disclosed Anonymously, "Fast wakeup of load dependent instructions by a select bypass", IP.com, IPCOM000216900, Apr. 23, 2012, 2 pages.

\* cited by examiner

TECHNIQUES TO WAKE-UP DEPENDENT INSTRUCTIONS FOR BACK-TO-BACK ISSUE IN A MICROPROCESSOR

BACKGROUND

Embodiments of the present disclosure generally relate to issuing instructions in a processor, and more specifically, to techniques for back-to-back issue of instructions in the processor.

A conventional superscalar processor may issue instructions out-of-order with respect to a predefined program order. Because subsequent instructions are often dependent upon results of previous instructions, an issue queue in the processor may use a dependency tracking scheme to ensure that all data dependencies are followed. For instance, in one approach, the processor includes an age array that tracks a relative age of instructions managed in the issue queue. The age array allows an instruction select logic to select an oldest ready entry in the issue queue for issue to an execution unit of the processor.

Issuing a given instruction from the issue queue may resolve outstanding operand dependencies for other instructions stored in the issue queue. In a current approach, the processor compares an instruction tag of a producer instruction selected for issue against source instruction tags of the instructions stored in the issue queue. The processor does so to identify dependent instructions to wake up (i.e., indicate to a given dependent instruction that source operands are available for that instruction) for possible issue in a next cycle. For optimal issue bandwidth, it is preferable to issue such instructions in the cycle immediately following the issue of the producer instruction. However, this approach creates a timing critical path due to the instruction tag comparisons after the producer instruction has been selected for issue.

SUMMARY

Another embodiment presented herein describes a processor. The processor generally includes an issue queue having a plurality of queue positions configured to store each of a plurality of instructions in a corresponding queue position. The issue queue stores a first instruction in a first queue position. The plurality of instructions includes at least a second instruction. The first instruction includes a target instruction tag and at least a source instruction tag. The source instruction tag specifies a logical register that stores source operand data. The processor also includes a table configured to store a target instruction tag associated with the first instruction. The table stores a plurality of target instruction tags, each target instruction tag in the plurality of instruction tags being associated with a corresponding one of the instructions. Each stored target instruction tag specifies a logical register that stores a target operand. The processor also includes an instruction selection logic configured to associate, with the second instruction, a pointer to the first instruction in the first queue position upon determining, based on the source instruction associated with the first instruction and the target instruction tag associated with the second instruction, that the first instruction is dependent on the second instruction. The pointer is used to wake up the first instruction upon issue of the second instruction.

Another embodiment presented herein describes a system having a processor coupled to a memory. The processor is configured to implement one or more aspects disclosed herein.

DETAILED DESCRIPTION

Embodiments presented herein describe techniques for issuing instructions in a processor. More specifically, the techniques provide a mechanism for issuing an instruction having an operand dependency on a previously issued instruction in a next cycle. In one embodiment, an issue unit includes an issue queue that maintains entries of instructions. Each instruction is associated with a target instruction tag containing a pointer to a logical register within the processor that will store the result of the instruction. In addition, each instruction is associated with one or more source instruction tags, each source instruction tag containing a pointer to a logical register that stores data for a source operand. Further, the issue unit also includes a target table that maintains entries of target instruction tags.

Further, in one embodiment, each instruction entry in the issue queue includes a "consumer_qpos" bit field. The consumer_qpos bit field of a previously dispatched instruction is a pointer that tracks an issue queue position of an instruction dependent to the instruction. That is, the dependent instruction includes a source operand that relies on the result of a target operand produced by the previously dispatched instruction.

In one embodiment, when the processor dispatches a new instruction to the issue queue, the target table stores a target instruction tag in an entry mapped to the corresponding instruction entry in the issue queue. As stated, the target instruction tag contains a pointer to a logical register that will store the result of the dispatched instruction.

The issue unit may determine operand dependencies of the dispatched instruction by comparing the source instruction tag of the dispatched instruction with each of the entries of the target table. A match between the source instruction tag and a given target instruction tag entry indicates that the dispatched instruction obtains source data from the logical register indicated in that target instruction tag. That is, the instruction associated with that target instruction tag is a producer for the dispatched instruction. The issue unit writes the issue queue entry location of the dispatched instruction to the consumer_qpos field of the youngest producer instruction (e.g., as determined by an age array in the processor that tracks a relative age of each of the instructions stored in the issue queue).

When the issue unit selects an instruction for issue from the issue queue during a given clock cycle, the issue unit reads the consumer_qpos field in the instruction entry. Doing so allows the issue unit to determine a location of an instruction that is dependent on the selected instruction, i.e., the instruction includes operands that are resolved by the selected instruction. The issue unit locates and wakes up the dependent instruction (i.e., indicates that source operands are available for the dependent instruction). As a result, the dependent instruction can issue in a next clock cycle.

Advantageously, recording a pointer to a dependent instruction in a previously issued instruction during dispatch eliminates the timing critical path occurring in previous back-to-back issue operation approaches. That is, rather than compare target and source instruction tags after instruction issue, the issue unit compares the instruction tags after dispatch. As a result, no extra clock cycle is required between issue of an instruction and a dependent instruction, thus further optimizing issue bandwidth.

Figure 1:
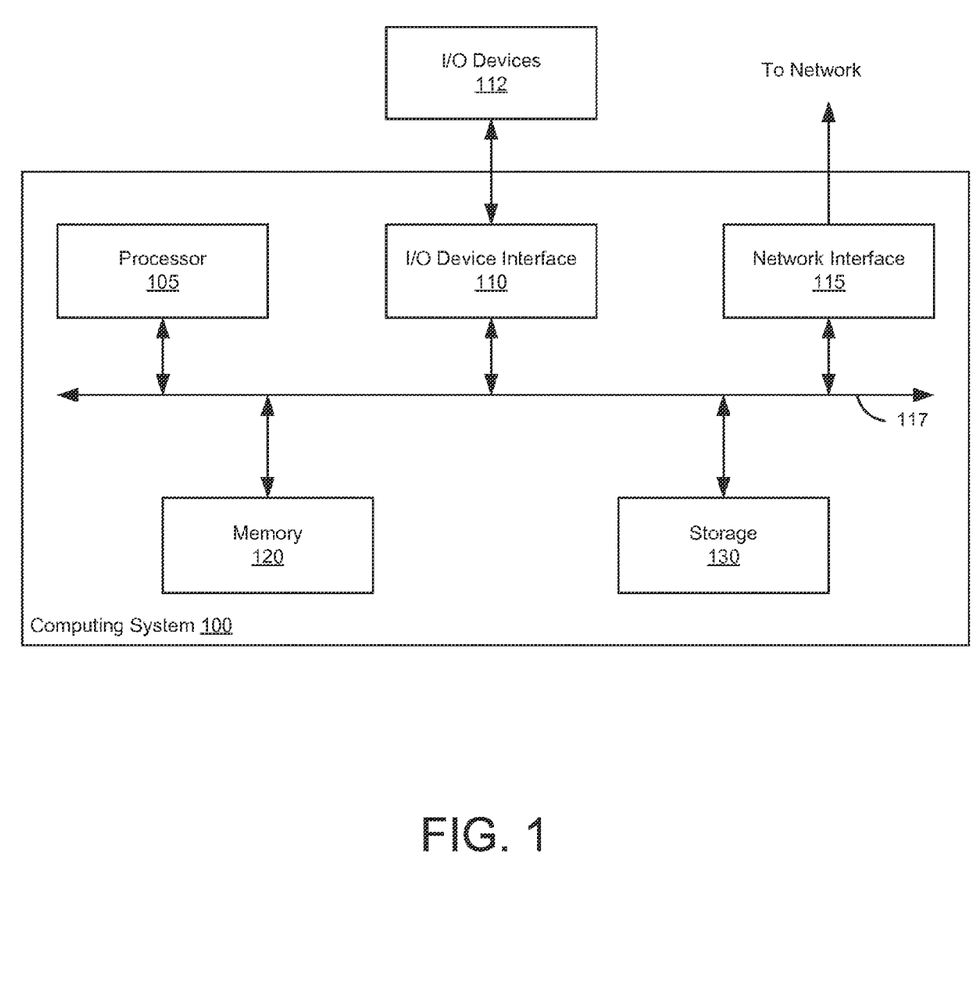
FIG. 1 illustrates an example computing system configured with a processor that issues back-to-back instructions, according to one embodiment.

FIG. 1 illustrates an example computing system 100 that includes a processor 105 configured to issue instructions in back-to-back cycles, according to one embodiment. As shown, the computing system 100 further includes, without limitation, a network interface 115, a memory 120, and a storage 130, each connected to a bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, etc. Of course, the computing system 100 will include a variety of additional hardware components.

The processor 105 retrieves and executes programming instructions stored in the memory 120 as well as stores and retrieves application data residing in the storage 130. The bus 117 is used to transmit programming instructions and application data between the processor 105, I/O device interface 110, network interface 115, memory 120, and storage 130. The memory 120 is generally included to be representative of a random access memory. The storage 130 may be a combination of fixed and/or removable storage devices, such as fixed disc drives, removable memory cards, or optical storage, network attached storage (NAS), or a storage-area network (SAN).

Figure 2:
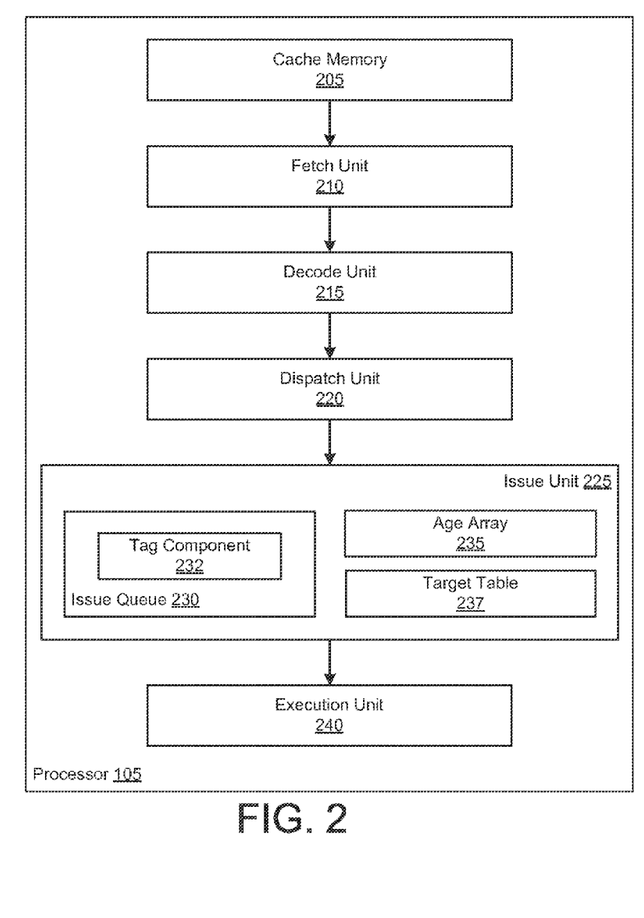
FIG. 2 further illustrates the processor described relative to FIG. 1, according to one embodiment.

FIG. 2 further illustrates the processor 105 configured to issue instructions in back-to-back cycles, according to one embodiment. As shown, the processor 105 includes a cache memory 205, a fetch unit 210, a decode unit 215, a dispatch unit 220, an issue unit 225, and an execution unit 240. Of course, the processor 105 may include additional components not shown in FIG. 2. The cache memory 205 may receive processor instructions from the memory 120, storage 130, network interface 115, or other sources not shown.

The cache memory 205 connects with the fetch unit 210. The fetch unit 210 fetches multiple instructions from the cache memory 205. Instructions may be in the form of an instruction stream that includes a series or a sequence of instructions. The fetch unit 210 connects with the decode unit 215. The decode unit 215 decodes instructions as resources of the processor 105 become available. The decode unit 215 connects with a dispatch unit 220. The dispatch unit 220 connects with the issue unit 225. In one embodiment, the dispatch unit 220 dispatches one or more instructions to the issue unit 225 during a processor 105 clock cycle.

As shown, the issue unit 225 includes an issue queue 230, an age array 235, and a target table 237. The issue queue 230 includes an instruction data store that stores issue queue instructions. For example, an issue queue that stores twelve instructions uses an instruction data store with twelve storage entries. The issue queue 230 may include an age array 235 that tracks relative age data for each instruction within the instruction data store. Further, the issue queue 230 includes instruction select logic that determines which of the stored instructions to issue at a given clock cycle. For example, the instruction select logic may select instructions based on relative age indicated by the age array 235. The instruction select logic may prioritize older instructions that have been previously rejected to issue over younger instructions in the issue queue 230. The issue unit 225 connects with an execution unit 240. The execution unit 240 may include multiple execution units that execute instructions from the issue queue 230 or other instructions.

In one embodiment, each instruction entry may be encoded with a "consumer_qpos" bit field that indicates a position in the issue queue 230 of a dependent instruction. The dependent instruction includes one or more operands that are resolved by the instruction in that entry. When a given instruction is issued, the issue unit 225 decodes and reads the consumer_qpos bits to identify a position in the issue queue 230 where the dependent instruction is stored. The issue unit 225 may then wake up the dependent instruction for possible issue in a next cycle.

In one embodiment, the issue queue 230 includes a tag component 232. At dispatch of a given instruction to the issue queue 230 during a clock cycle, the tag component 232 associates instruction tags with that instruction. Each instruction tag uniquely identifies the instruction within the processor 105. In addition, an instruction tag may include register information that other units in the processor 105 may reference. For instance, each instruction may be associated with a target instruction tag and one or more source instruction tags. In one embodiment, a target instruction tag includes a pointer to a logical register within the processor 105 that stores a result produced by the dispatched instruction. Further, a source instruction tag includes a pointer to the logical register that will contain the data used by the corresponding source operand. The issue unit 225 may reference instruction tags of a given instruction to track operand dependencies.

In one embodiment, the target table 237 is a data structure having a number of target instruction tag entries, where each entry maps one-to-one to an entry in the instruction data store. For example, assume that the issue queue 230 maintains twelve instruction entries. In such a case, the target table 237 maintains twelve entries, each entry mapping to one of the twelve entries in the instruction data store. The target table 237 stores a target instruction tag of a dispatched instruction in one of the table entries. At issue of a given instruction from the issue queue 230, the target table 237 removes the corresponding instruction tag from the stored entry in the table 237. Further, if the issue unit 225 flushes the instruction from the issue queue 230, the target table 237 flushes the corresponding instruction tag from the entry in the table 237.

In one embodiment, at dispatch of a given instruction, the target table 237 performs a lookup operation (e.g., a content addressable memory (CAM) lookup) using the source instruction tag against each entry of the target table 237. The CAM lookup identifies target instruction tags in the target table 237 that match the source instruction tag. A match between the source instruction tag and a target instruction tag indicates that the dispatched instruction depends on the producer instruction associated with the target instruction tag. That is, both the source instruction tag and the target instruction tag point to the same logical register. The instruction associated with the target instruction tag produces a resulting operand that is written to the logical register. And the dispatched instruction uses the resulting operand stored in that logical register.

In such a case, the CAM lookup may generate a 1-hot vector that the issue unit 225 may use to record an issue queue 230 position of the dispatched instruction to the consumer_qpos field of the youngest producer instruction entry. During a given clock cycle, at issue of the producer instruction to the execution unit 240, the issue unit 225 decodes and reads the consumer_qpos bits recorded in the producer instruction entity. Doing so allows the issue unit 225 to determine a location in the issue queue 230 of the dependent instruction (or a location of the instruction during dispatch of the instruction to the issue queue 230). During the clock cycle, the issue unit 225 may wake up the dependent instruction at that location for possible issue in the next cycle, provided no other instructions have a higher priority for selection (e.g., older instructions that are ready for issue) and that the operand dependencies are resolved for the dependent instruction. Advantageously, the issue unit 225 may issue the dependent instruction back-to-back in the next cycle relative to the producer instruction, thus improving issue bandwidth.

Figure 3:
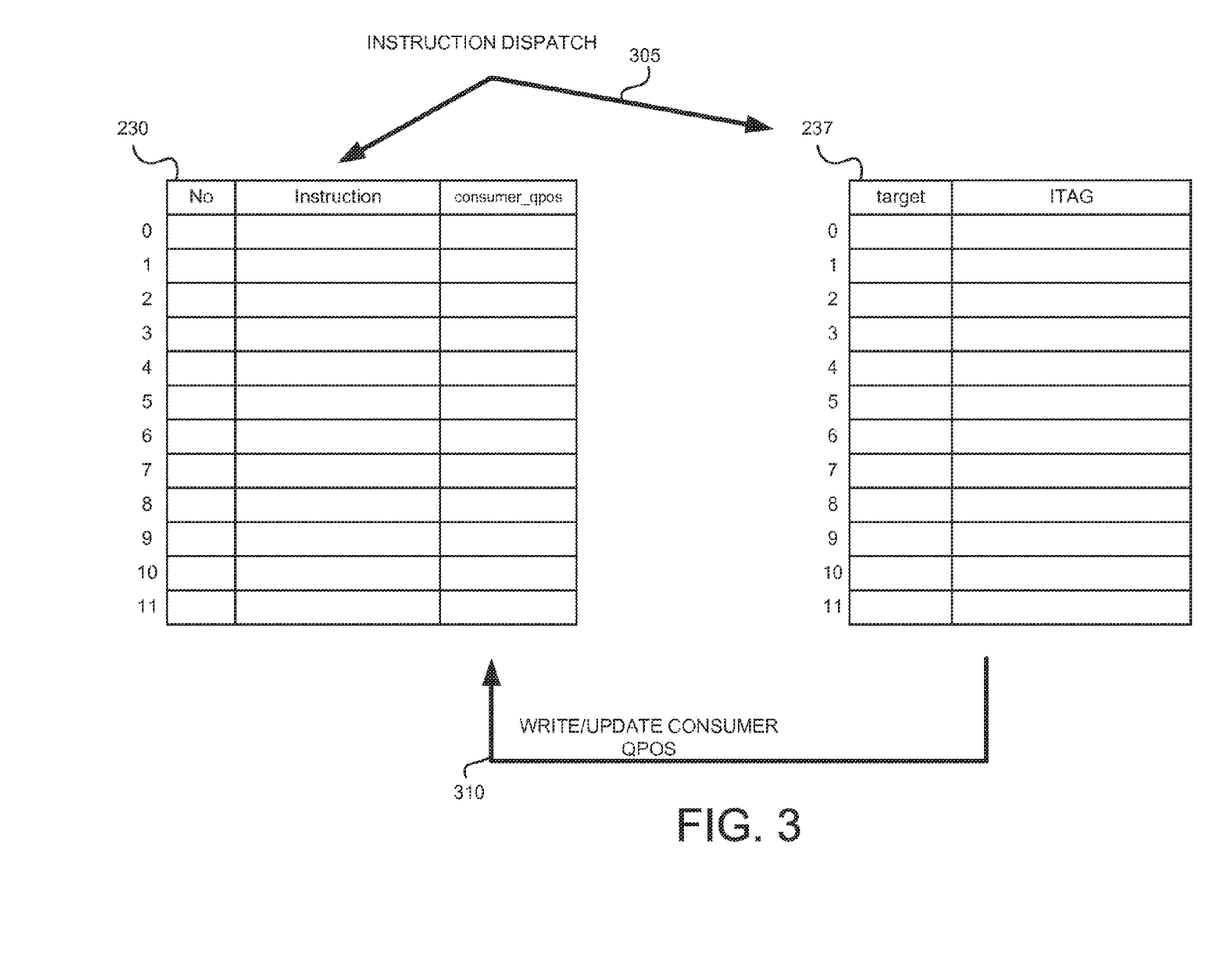
FIG. 3 illustrates an example mechanism used to track operand dependencies for back-to-back instruction issue, according to one embodiment.

FIG. 3 illustrates an example mechanism used to track operand dependencies for back-to-back instruction issue, according to one embodiment. In particular, FIG. 3 depicts the issue queue 230 and the target table 237.

Illustratively, the issue queue 230 includes twelve positions for instruction entries. At dispatch to the issue queue 230, the instruction is stored in one of the twelve entries. As shown, an instruction entry may include information such as a program number, an instruction, and a consumer issue queue 230 position. Of course, each entry in the issue queue 230 may include additional information (e.g., operand data).

As shown, the target table 237 includes an identical amount of entries relative to the issue queue 230. As stated, each entry of the target table 237 stores a target instruction tag that is associated with an instruction stored in the issue queue 230. Each target instruction tag entry may include information such as a valid bit, an instruction tag identifier, and a pointer to a logical register that will store a result produced by the associated instruction. Of course, the target table 237 may store additional information. At 305, when the dispatch unit 220 dispatches an instruction to the issue queue 230, the issue queue 230 stores the instruction in one of the entries. Further, the tag component 232 associates a target instruction tag and one or more source instruction tags with the instruction. The target table 237 stores the target instruction tag.

As stated, the issue unit 225 may compare, via a CAM lookup operation, source instruction tags against each entry in the target table 237. If a given source instruction tag matches a target table 237 entry, issue unit 225 writes or updates the consumer_qpos field of the instruction associated with the target instruction tag (at 310). To do so, the issue unit 225 may output an n-bit hot address to write the queue position of the dispatched instruction to the instruction entry associated with the target operand, where n equals the number of entries stored in the issue queue 230.

Figure 4:
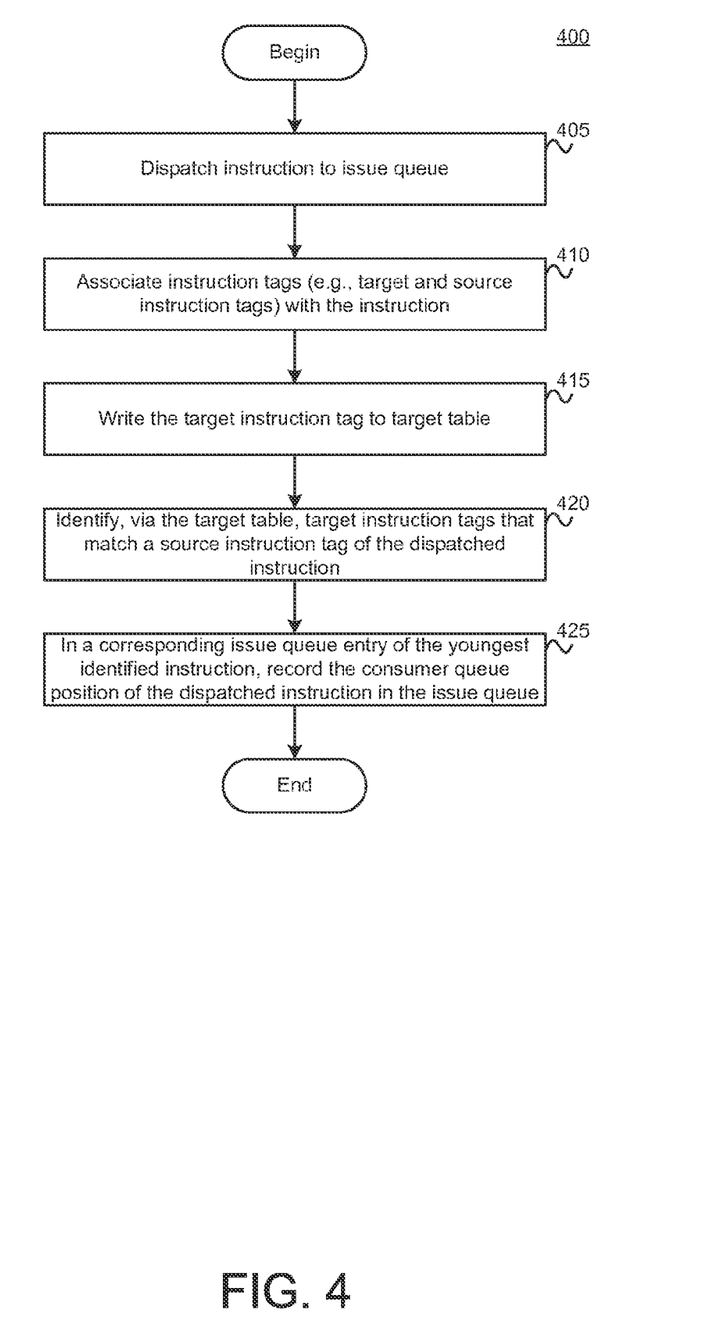
FIG. 4 illustrates a method for determining operand dependencies of an instruction dispatched to an issue queue, according to one embodiment.

FIG. 4 illustrates a method 400 for determining operand dependencies of an instruction dispatched to an issue queue, according to one embodiment. Method 400 begins at step 405, where the dispatch unit 220 dispatches an instruction to the issue queue 230. The issue queue 230 stores the instruction in the queue 230 at an entry position. Then, at step 410, the tag component 232 associates instruction tags with the dispatched instruction. As stated, the instruction may be associated with a target instruction tag and one or more source instruction tags. Each instruction tag uniquely identifies the instruction within the processor 105.

At step 415, the issue unit 220 stores the instruction tag to the target table 237. As stated, the target table 237 includes target instruction tags of other previously dispatched instructions stored in the issue queue 230. At step 420, the issue unit 220 identifies, via a CAM lookup operation on the target table 237, target instruction tags that match the source instruction tag of the dispatched instruction. As stated, a match between the source instruction tag and a given target instruction tag indicates that the instruction associated with the target instruction tag produces an operand for the dispatched instruction.

At step 425, the issue queue 230 records a queue position of the dispatched instruction into the consumer_qpos bit field of each producer instruction entry (if any). Doing so allows the issue queue 230 to identify the location of the youngest dispatched consumer entry to be located at issue of a given producer instruction. The issue queue 230 may wake up the consumer instruction during the same clock cycle that the producer instruction issues.

Figure 5:
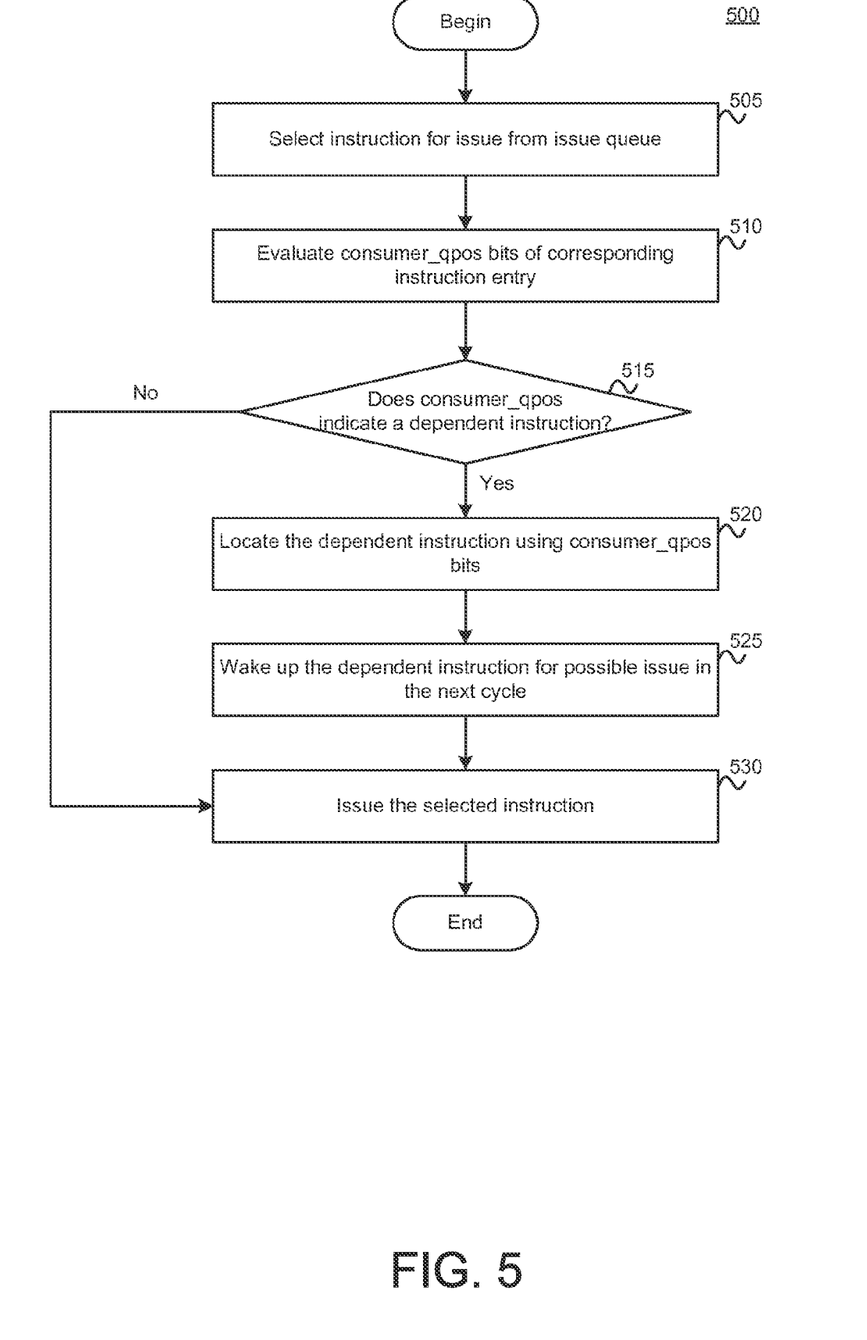
FIG. 5 illustrates a method for issuing back-to-back instructions in a processor, according to one embodiment.

FIG. 5 illustrates a method 500 for issuing back-to-back instructions in a processor, according to one embodiment. As shown, method 500 begins at step 505, where the instruction select logic of the issue queue 230 selects an instruction for issue during a given cycle. At step 510, the instruction select logic evaluates the consumer_qpos bit field of the corresponding instruction entry. At step 515, the instruction select logic determines whether any other instructions, e.g., in the issue queue 230 or currently being dispatched to the issue queue 230, have operand dependencies on the selected instruction. If not, then at step 530, the issue queue 230 issues the selected instruction to an execution unit 240.

Otherwise, at step 520, the instruction select logic locates the dependent instruction specified in the consumer_qpos bits. To do so, the instruction select logic may decode the consumer_qpos bits and read the bits to identify the issue queue 230 position of the corresponding instruction entry. At step 525, once identified, the instruction select logic wakes up the dependent instruction for possible issue in cycle immediately following the issue of the selected instruction. For instance, the dependent instruction may issue if all operand dependencies are resolved after the execution of the selected instruction. Otherwise, the instruction select logic may instead select a next oldest instruction for issue.

At step 530, the issue queue 230 issues the selected instruction. At issue, the target table 237 clears the corresponding instruction tag entry in the table 237. As stated, if the dependent instruction is ready for issue at the next cycle, then the instruction select logic may select that instruction for issue. Doing so results in the dependent instruction being issued back-to-back relative to the producer instruction. Advantageously, issue bandwidth is further optimized as a result.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A processor, comprising:
    an issue unit;
    an issue queue having a plurality of queue positions configured to store each of a plurality of instructions in a corresponding queue position, the issue queue storing a first instruction in a first queue position, the plurality of instructions including at least a second instruction, the first instruction including a target instruction tag and at least a source instruction tag, the source instruction tag specifying a logical register that stores source operand data;
    a table configured to store a target instruction tag associated with the first instruction, wherein the table stores a plurality of target instruction tags, each target instruction tag in the plurality of target instruction tags being associated with a corresponding one of the instructions, each stored target instruction tag specifying a logical register that stores a target operand,
    wherein at dispatch of the first instruction, the issue unit compares the source instruction tag of the first instruction with each of the target instruction tags in the table,
    wherein, at dispatch of the first instruction, the issue unit further associates, with the second instruction, a pointer to the first instruction in the first queue position upon determining, based on the source instruction tag associated with the first instruction and the target instruction tag associated with the second instruction, that the first instruction is dependent on the second instruction, and further based on determining that the second instruction is younger than all other instructions in the issue queue upon which the first instruction is dependent, and
    wherein the issue unit uses the pointer to wake up the first instruction upon issue of the second instruction.

2. The processor of claim 1, wherein each target instruction tag is used to track operand dependencies between instructions stored in the issue queue.

3. The processor of claim 1, wherein the table determines that the first instruction is dependent on the second instruction by evaluating the source instruction tag associated with the first instruction and the target instruction tag associated with the second instruction, and by determining that the source instruction tag matches the target instruction tag.

4. The processor of claim 1, wherein, in a current cycle in which the second instruction is issued, the table removes the target instruction tag associated with the second instruction.

5. The processor of claim 1, wherein the instruction selection logic is further configured to:
at issue of the second instruction in a current cycle, read the pointer to identify the first queue position, and
wake up the first instruction at the first queue position.

6. The processor of claim 5, wherein the issue queue is further configured to issue the first instruction in a cycle next to the current cycle.

7. The processor of claim 1, further comprising:
an age array configured to track an age of each of the stored instructions in the issue queue.

8. The processor of claim 7, wherein the first instruction is associated with a second source instruction tag that matches a target instruction tag of a third instruction in the plurality of instructions, and wherein the issue unit associates, with the second instruction, the pointer to the first instruction in the first queue position based upon further determining that the second instruction is younger than the third instruction.

9. The processor of claim 7, wherein the table comprises a plurality of entries that map one-to-one with a queue position in the issue queue, and wherein each entry stores a target instruction tag for a corresponding instruction in the issue queue.

10. A system, comprising:
a memory; and
a processor coupled to the memory, comprising:
an issue unit;
an issue queue having a plurality of queue positions configured to store each of a plurality of instructions in a corresponding queue position, the issue queue storing a first instruction in a first queue position, the plurality of instructions including at least a second instruction, the first instruction including a target instruction tag and at least a-source instruction tag, the source instruction tag specifying a logical register that stores source operand data;
a table configured to store a target instruction tag associated with the first instruction, wherein the table stores a plurality of target instruction tags, each target instruction tag in the plurality of target instruction tags being associated with a corresponding one of the instructions, each stored target instruction tag specifying a logical register that stores a target operand,
wherein at dispatch of the first instruction, the issue unit compares the source instruction tag of the first instruction with each of the target instruction tags in the table,
wherein, at dispatch of the first instruction, the issue unit further associates, with the second instruction, a pointer to the first instruction in the first queue position upon determining, based on the source instruction tag associated with the first instruction and the target instruction tag associated with the second instruction, that the first instruction is dependent on the second instruction, and further based on determining that the second instruction is younger than all other instructions in the issue queue upon which the first instruction is dependent, and
wherein the issue unit uses pointer to wake up the first instruction upon issue of the second instruction.

11. The system of claim 10, wherein each target instruction tag is used to track operand dependencies between instructions stored in the issue queue.

12. The system of claim 10, wherein the table determines that the first instruction is dependent on the second instruction by evaluating the source instruction tag associated with the first instruction and the target instruction tag associated with the second instruction, and by determining that the source instruction tag matches the target instruction tag.

13. The system of claim 10, wherein the instruction selection logic is further configured to:
at issue of the second instruction in a current cycle, read the pointer to identify the first queue position, and
wake up the first instruction at the first queue position.

14. The system of claim 13, wherein the issue queue is further configured to issue the first instruction in a cycle next to the current cycle.

15. The system of claim 10, wherein the processor further comprises:
an age array configured to track an age of each of the stored instructions in the issue queue.

16. The system of claim 15, wherein the first instruction is associated with a second source instruction tag that matches a target instruction tag of a third instruction in the plurality of instructions, and wherein the issue unit associates, with the second instruction, the pointer to the first instruction in the first queue position based upon further determining that the second instruction is younger than the third instruction.

17. The system of claim 15, wherein the table comprises a plurality of entries that map one-to-one with a queue position in the issue queue, and wherein each entry stores a target instruction tag for a corresponding instruction in the issue queue.

\* \* \* \* \*